US006776538B2

(12) United States Patent
Whitney et al.

(10) Patent No.: US 6,776,538 B2
(45) Date of Patent: Aug. 17, 2004

(54) MEMS TUNABLE OPTICAL FILTER SYSTEM WITH MOISTURE GETTER FOR FREQUENCY STABILITY

(75) Inventors: Peter S. Whitney, Lexington, MA (US); Jeffrey A. Korn, Lexington, MA (US); Michael F. Miller, Hollis, NH (US); Raymond V. Pourmand, Hudson, NH (US)

(73) Assignee: Axsun Technologies, Inc., Billerica, MA (US)

( * ) Notice: Subject to any disclaimer, the term of this patent is extended or adjusted under 35 U.S.C. 154(b) by 28 days.

(21) Appl. No.: 10/021,765

(22) Filed: Dec. 12, 2001

(65) Prior Publication Data

US 2003/0108306 A1 Jun. 12, 2003

(51) Int. Cl.[7] .............................. G02B 6/36; H01S 3/04
(52) U.S. Cl. .............................. 385/94; 385/92; 372/34
(58) Field of Search .................... 385/92–94; 372/34–36

(56) References Cited

U.S. PATENT DOCUMENTS 5,793,916 A * 8/1998 Dahringer et al. ............ 385/95
6,085,005 A * 7/2000 Gates et al. ................... 385/88
6,373,620 B1 * 4/2002 Wang .......................... 359/315
6,498,879 B1 * 12/2002 Huang et al. ................. 385/43
2002/0064352 A1 * 5/2002 Andersen et al. ............. 385/92

* cited by examiner

Primary Examiner—Rodney Bovernick
Assistant Examiner—Tina M Lin
(74) Attorney, Agent, or Firm—J. Grant Houston

(57) ABSTRACT

In optoelectronic systems, package moisture can affect stress levels in dielectric coatings on MEMS devices. Specifically, as the moisture content in these dielectric coatings changes, there are concomitant changes in the material stress. These changes in material stress can affect the operation of the overall MEMS device. Specifically, in the context of tunable filters, moisture can lead to a drift in the size of the optical resonant cavity over time as changes in material stress affect the MEMS structures. According to the invention, a getter is added to the package to absorb moisture, and thereby stabilize the operation of the optical filter, and specifically prevent uncontrolled drift in the size of its optical cavity.

11 Claims, 6 Drawing Sheets

MEMS TUNABLE OPTICAL FILTER SYSTEM WITH MOISTURE GETTER FOR FREQUENCY STABILITY

BACKGROUND OF THE INVENTION

Modern wavelength division multiplexing (WDM) systems many times have channel spacings of less than 100 Gigahertz. In fact, systems are being proposed that have spacings as narrow as 10 to 20 Gigahertz.

Optical spectrum analyzers are typically used to scan the spectrum of the WDM signal in order to confirm the proper operation of the WDM system. Because of the fine spectral detail implicit in the WDM signals, narrow bandwidth tunable filters are many times used in the optical spectrum analyzers.

High finesse, high-performance filters require high reflectivity (HR) layers made with thin film, dielectric coatings to define the filters' optical cavities. Common configurations include microelectromechanical system (MEMS) tunable Fabry-Perot filters. Actuation mechanisms, such as thermal or electrostatic, are used to modulate the distance between these HR layers and thus, the spectral location of the filter's passband.

The size of the optical cavity of the tunable filter must be stable. The change in size of the optical cavity of, for example, less than a nanometer, changes the location of the passband of the optical spectrum analyzer the spectral distance between channels, in some systems. When these changes occur in an uncontrolled fashion, confusion can occur in the interpretation of the data from the system. The stability is even required when a separate monitoring signal, with known spectral characteristics is used, to calibrate the MEMS tunable filter. Typically, the drift in the size of the cavity must be less than the capture range of the reference signal system.

SUMMARY OF THE INVENTION

Getters have been used in the hermetic packages of active optoelectronic systems. Water or organics in the package can increase the temperature at the semiconductor laser's facets, increasing the risk of catastrophic optical damage (COD).

Moisture getters have also been proposed for use with MEMS devices. A common problem associated with MEMS devices is stiction, or the undesirable interfacial adhesion between a movable MEMS structure and an adjoining surface. Stiction forces are sometimes generated by surface moisture. Placing moisture getters in the hermetic package can reduce the moisture level and thus, the risk of stiction attachment in these devices. Lowering moisture can also prevent propagation of microcracks.

We have isolated another modality by which moisture in a MEMS hermetic package can lead to an unintended operation. Specifically, it surrounds the interaction between package moisture and stress levels in dielectric coatings on MEMS devices. Specifically, as the moisture content in these dielectric coatings changes, there are concomitant changes in the material stress. These changes in material stress can affect the operation of the overall MEMS device. Specifically, in the context of tunable filters, moisture can lead to a temporal drift in the size of the optical resonant cavity as changes in material stress affect the MEMS structures. Also electrostatic charging effects in devices with high bias voltages (e.g., greater than 50 Volts) sometimes occur with module moisture.

In general, according to one aspect, the invention features an optical filter system. In the illustrated embodiments, this optical filter system is an optical spectrum analyzer. The system comprises a package and an optical filter, which is installed within the package. This filter has at least two thin film, dielectric mirrors, which define an optical resonant cavity. According to the invention, a getter is added to the package to absorb moisture, and thereby stabilize the operation of the optical filter, and specifically prevent uncontrolled drift in the size of the optical cavity.

In the preferred embodiment, the package is a hermetic package. Thus, the inclusion of the getter in the package leads to a long-term stable, low moisture environment.

In the present implementation, the optical filter is a tunable filter and at least one of the mirrors is disposed on a release structure. Presently, a membrane-type release structure is being used.

In operation, the getter absorbs moisture in the package to stabilize a material stress in the thin film mirrors and possibly other thin film coatings, such as antireflective AR coatings, and thereby stabilize the dimensions of the optical resonant cavity.

Presently, the tunable filter is a high-performance tunable filter. Its mirrors comprise alternating layers of tantalum pentoxide and silicon dioxide or titanium oxide and silicon dioxide. Its AR coatings comprise layers of silicon dioxide and titanium oxide. Even when these layers are hardened in an ion-assisted deposition system, they are still susceptible to material stress changes from environmental moisture. The effect is reduced by the use of the getter according to the present invention.

In general, according to another aspect, the invention features a process for packaging an optical filter. This process comprises installing an optical filter having at least two thin-film mirrors in a package. A getter is placed in the package to absorb moisture during operation. The package is then sealed with the optical filter and getter inside.

The above and other features of the invention including various novel details of construction and combinations of parts, and other advantages, will now be more particularly described with reference to the accompanying drawings and pointed out in the claims. It will be understood that the particular method and device embodying the invention are shown by way of illustration and not as a limitation of the invention. The principles and features of this invention may be employed in various and numerous embodiments without departing from the scope of the invention.

BRIEF DESCRIPTION OF THE DRAWINGS

In the accompanying drawings, reference characters refer to the same parts throughout the different views. The drawings are not necessarily to scale; emphasis has instead been placed upon illustrating the principles of the invention. Of the drawings.

DETAILED DESCRIPTION OF THE PREFERRED EMBODIMENTS

Figure 1:
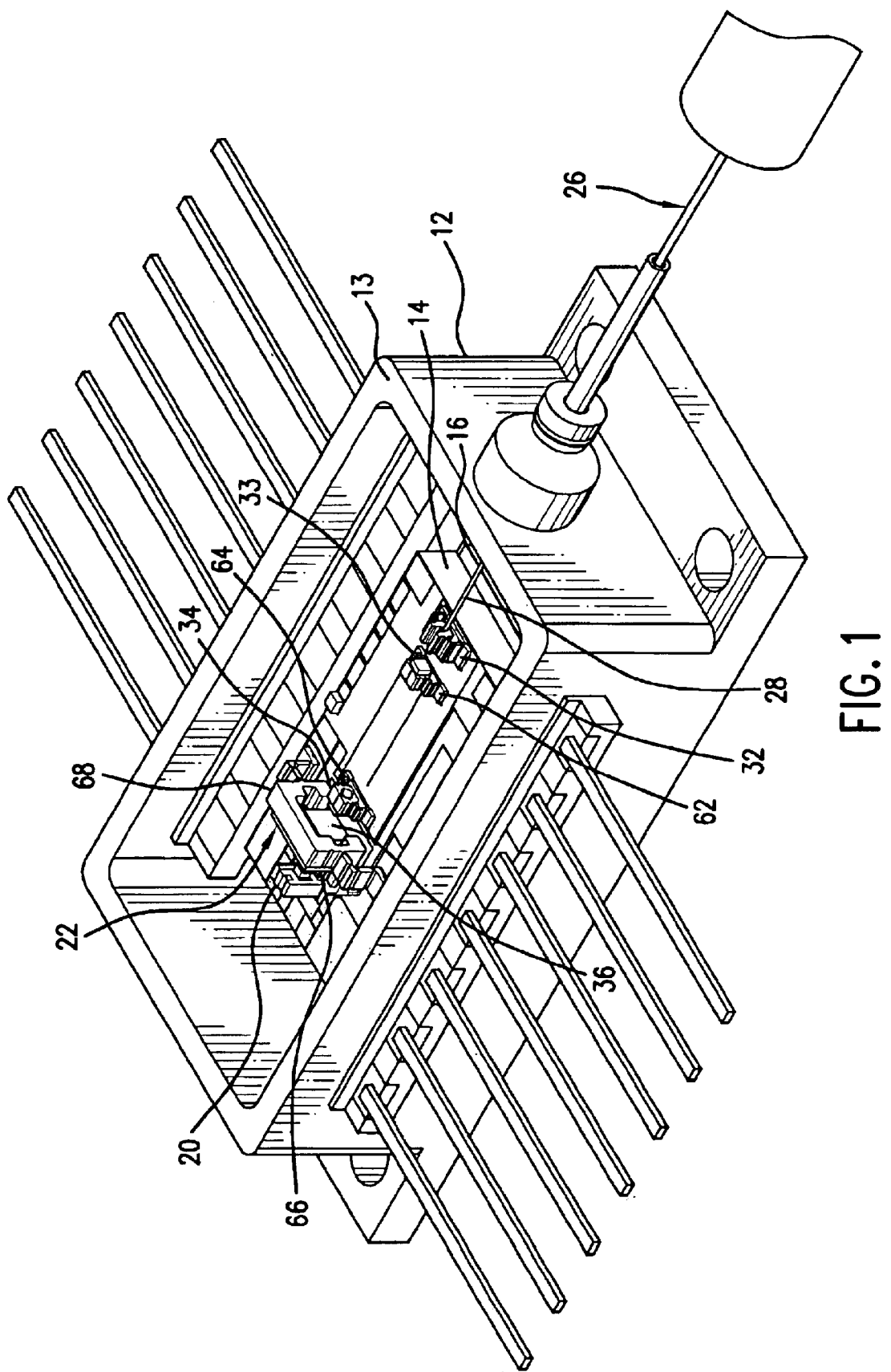
FIG. 1 is perspective view of an optical spectrum analyzer with a MEMS tunable filter, to which the present invention is applicable.
Figure 2:
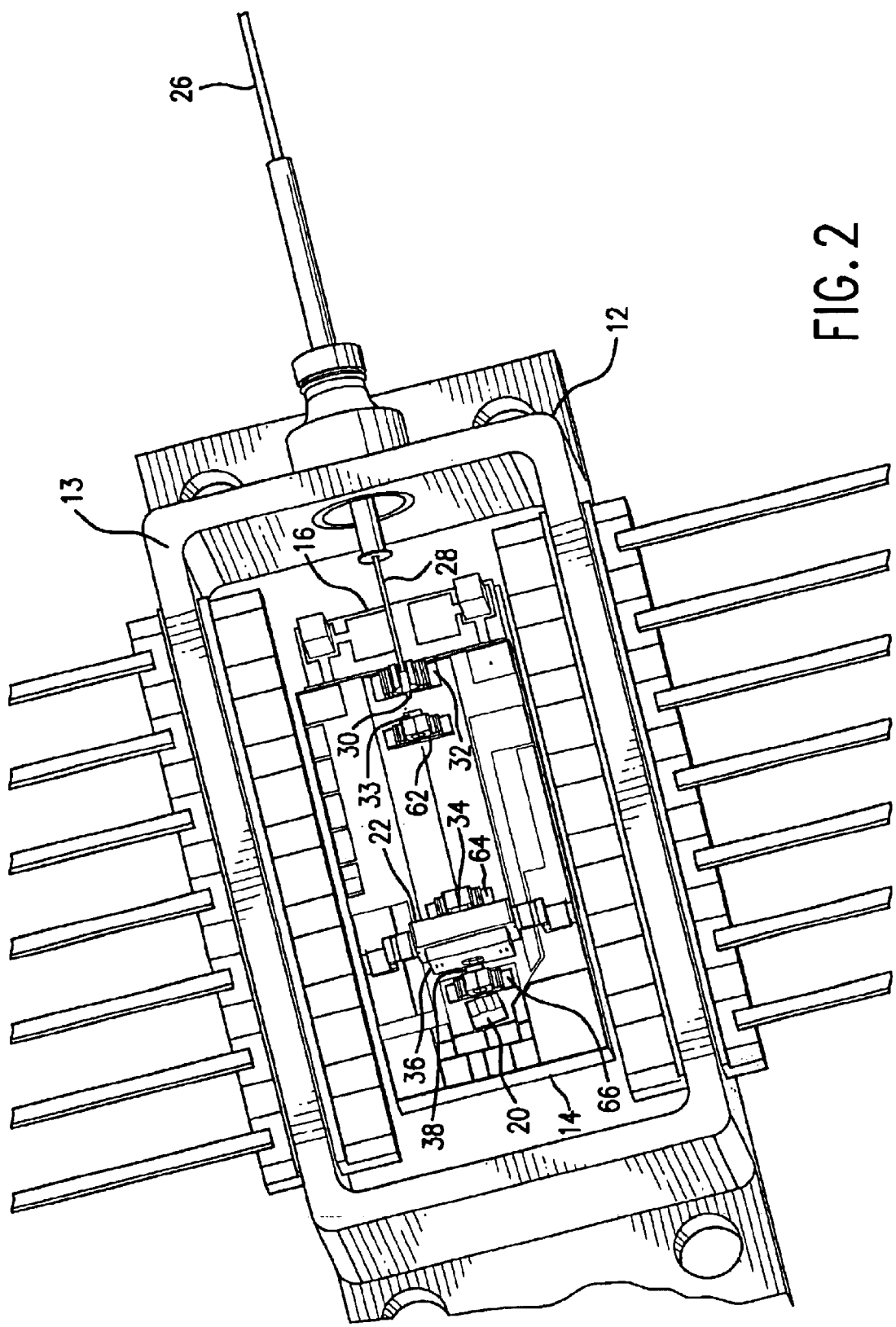
FIG. 2 is different perspective view of the optical spectrum analyzer.

FIGS. 1 and 2 show an optical spectrum analyzer utilizing a tunable optical filter system, to which the principles of the present invention are applicable.

Specifically, the tunable optical filter system generally comprises a package 12 and an optical bench 14, which is sometimes referred to as a submount. The bench 14 is installed in the package, and specifically on a thermoelectric (TE) cooler 16, which is located between the bench 14 and the package 12, in the specific illustrated embodiment.

The optical system, which is installed on the top surface of the bench 14, generally comprises a detector 20, a MEMS tunable filter system 22, and a signal source 26.

In more detail, the optical signal to be monitored is transmitted into the package 12 of the system via a fiber pigtail 28, in the illustrated example. This pigtail 28 terminates at an endface 30 that is secured above the bench 14 using a fiber mounting structure 32 in the illustrated implementation. The optical signal passes through a first lens optical component 33 and a second lens optical component 34, which launches the optical signal into a tunable filter optical component 36. A MEMS implementation of the tunable filter is shown. The filtered signal passes through a third lens optical component 38 and is then detected by the optical signal detector 20.

In the illustrated implementation, each of the lenses 33, 34, 38, and tunable filter optical component 36 are secured to the bench 14 via respective mounting structures 62, 64, 66, 68. These structures are currently deformable structures that enable post bench-attach alignment via plastic deformation.

Figure 3:
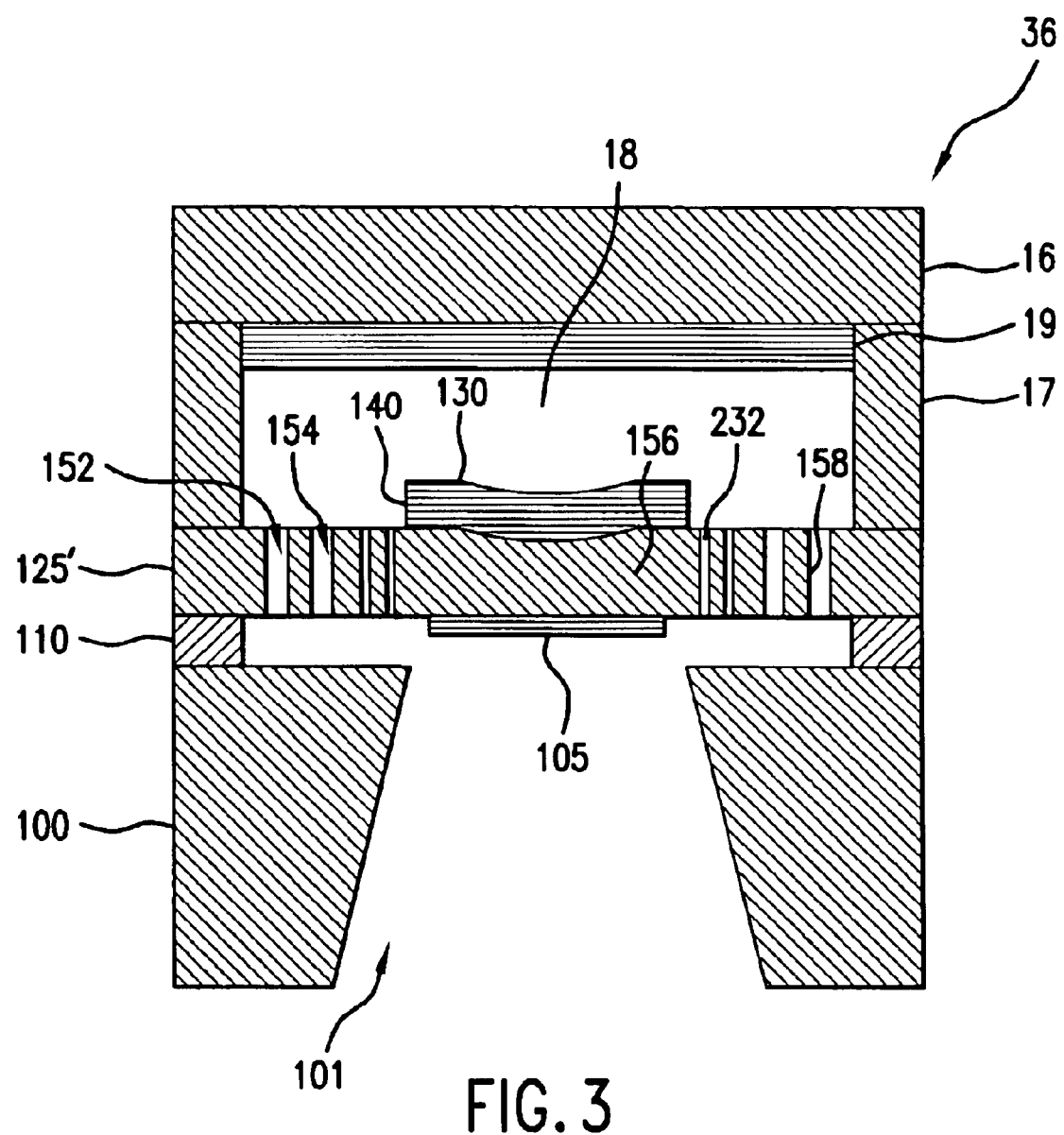
FIG. 3 is a schematic cross-sectional view of an exemplary MEMS tunable filter showing the dielectric optical coatings and deflectable membrane.

FIG. 3 shows one example of a MEMS tunable filter 36 incorporating dielectric HR mirror coatings 140, 19 defining the optical resonant cavity 18.

An optical axis of the device 36 passes through an optional optical port 101, which extends through the support or handle material 100 to a release layer 125'. The release layer 125' is separated from the handle material 100 by a sacrificial layer 110.

The illustrated example, the MEMS membrane release layer 125' is patterned to have a membrane body and tether pattern. Specifically, voids 152 and 154 are formed in the release layer 125' to define the tethers 158, along with release holes 232. The tethers 158 extend from an outer portion to the center membrane body 156.

In operation, modulation of the voltage between the handle material 100 and the release layer 125' yields out-of-plane deflection of the membrane body 156.

A dielectric optical coating 140 is deposited on the membrane body 156. A second HR layer 19 is deposited on a substrate 16, which is separated from the membrane via a spacer layer 17. An anti-reflection (AR) coating 105 is preferably deposited through the optical port 101 onto the exterior surface of the membrane layer 125' and/or possibly the substrate 16.

Presently, alternating quarterwave thickness layers of tantalum pentoxide and silicon dioxide are used for mirror layers 19 and 140. The reflectivity at the wavelengths of interest is greater than 95% and preferably greater than 99%, at about 1550 nanometers for typical WDM wavelengths.

In the illustrated embodiment, the curved mirror is located on the membrane. In other implementations, the curved surface is located on the mirror device. The advantage to the placement on the membrane body concerns the ability to manufacture the mirror device integrated with the spacer using SOI material, for example. In still other implementations, both mirrors are flat to form a flat-flat cavity. Curved-curved cavities are still another possibility.

Figure 4:
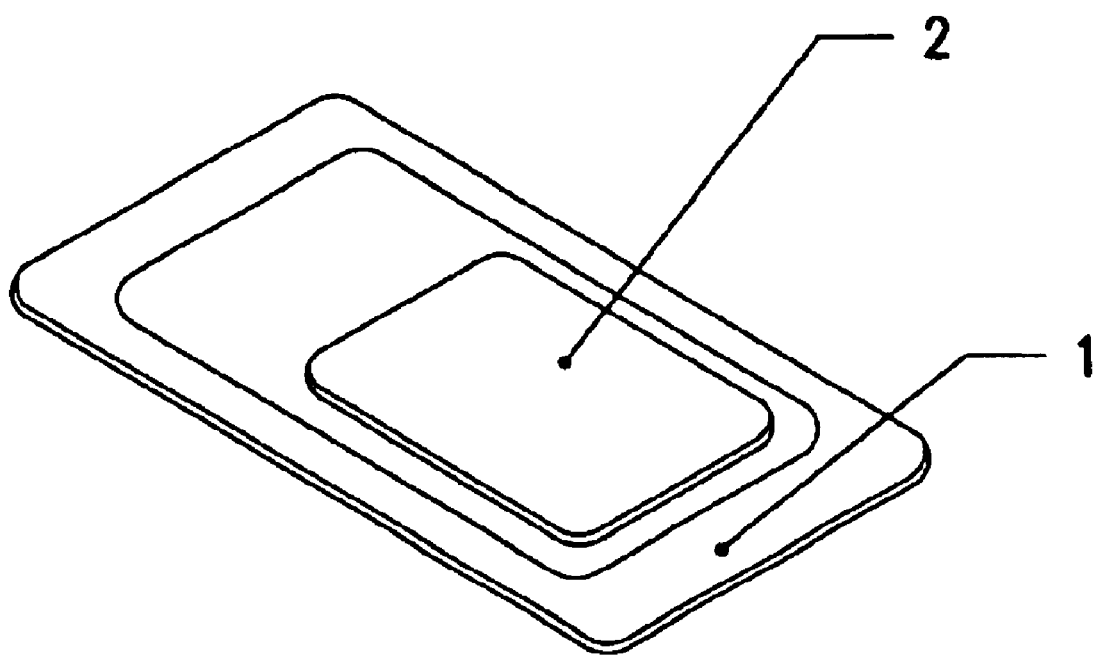
FIG. 4 is a schematic view of the hermetical package lid with the applied moisture getter according to the present invention.

FIG. 4 shows the lid 1 that is seam sealed to the rim 13 of the package 12 in order to hermetically seal the inside of the package 12 and the MEMS tunable filter component 36 from the external environment. According to the invention, a moisture getter 2 is applied to the inner side of the lid 1.

Figure 5:
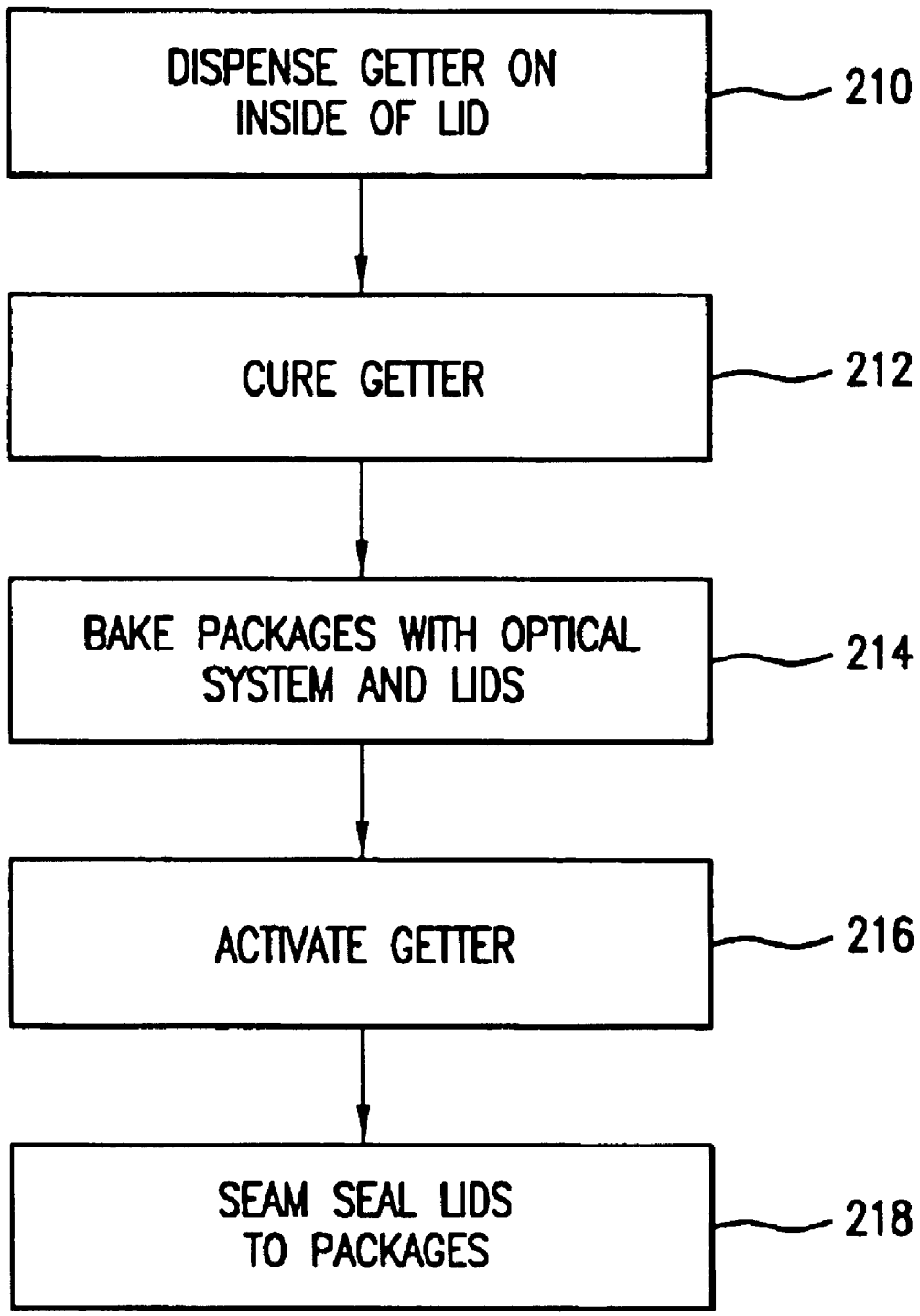
FIG. 5 is a process diagram illustrating the integration of the moisture getter in the fabrication of the optical spectrum analyzer.

FIG. 5 shows the process for inclusion of the getter 2 in the hermetic package 12 according to the present invention. Specifically, in step 210, the getter 2 is dispensed on the inside of the lid 1 as shown in FIG. 4. Presently, STAYDRY™, HiCap 2000, high capacity moisture getter from Cookson Electronics is used. Presently, it is placed on the inside lid 1, covering 50%±10% of the lid's inside surface area.

Next, in step 212, the getter is cured according to the manufacturer's directions.

Presently, the getter is cured for 45 minutes ±5 minutes at 150° C.

Then, in step 214, the packages, with the optical systems, and the lids are baked to remove moisture. For example, in one implementation, the lids and packages are baked for 12 hours at 85° C. under alternating vacuum and nitrogen purge cycles. This drying process, when employed without a getter, will yield modules with a moisture level of 500–1000 parts per million (ppm).

Then, in step 216, just prior to lid sealing, the getter 2 is activated. In one example, activation is achieved by exposing the lids to 175° C. for approximately 20 minutes. Then, finally, in step 218, the lids are seam sealed to the packages. Adding the getter reduces the background moisture level to 250 ppm.

Plots 6A and 6B illustrate the performance advantage associated with the use of the moisture getter 2.

Figure 6A:
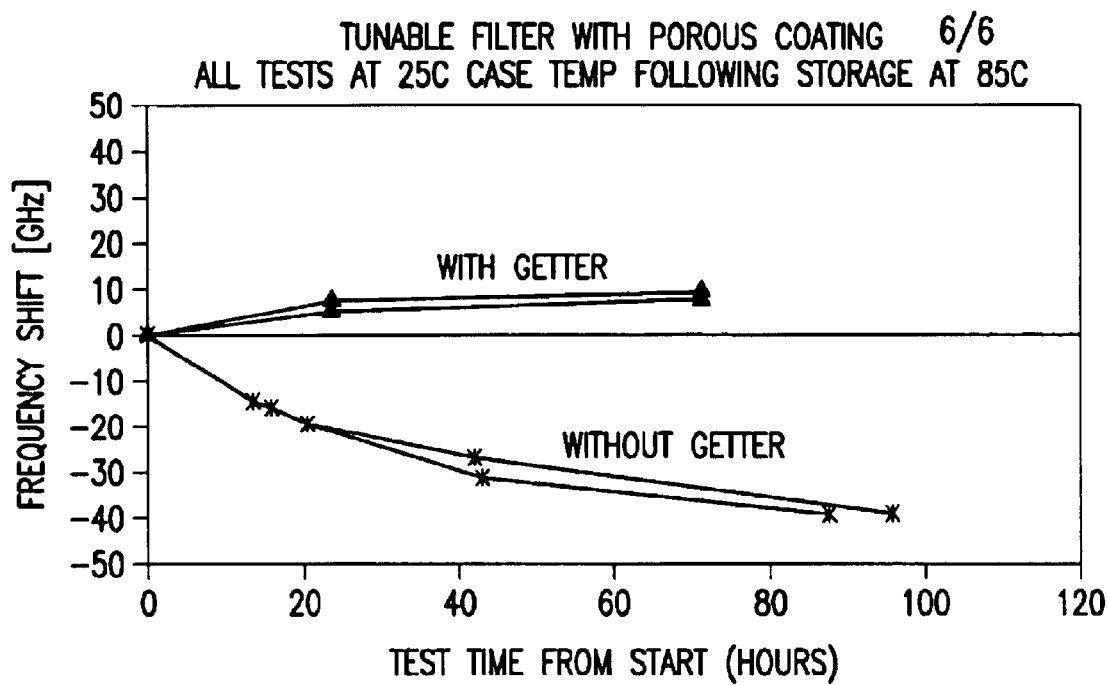
FIG. 6A is a plot showing the frequency stability of modules without a getter and modules with a getter in which the AR coatings have not been deposited with ion-assisted deposition.

Specifically, as illustrated in FIG. 6A, without the getter, the zero voltage passband frequency of the tunable filter system tends to drift with time. Specifically, drift of over 30 GHz was shown in two modules after about 70 hours. In contrast, getter models drifted less than 10 GHz over that period.

The modules used to generate the FIG. 6A data had AR coatings 105 that were deposited without ion-assist.

Figure 6B:
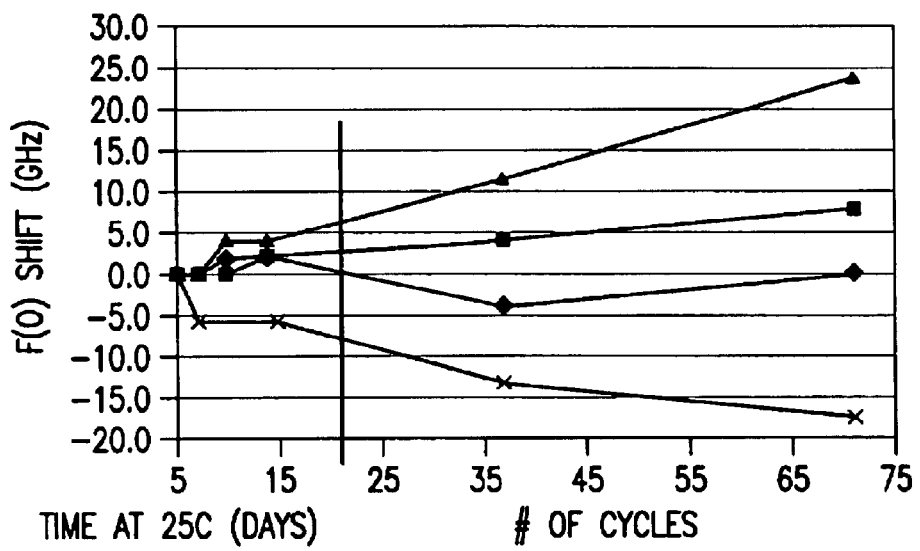
FIG. 6B is a plot showing the frequency stability of modules without a getter and modules with a getter in which the AR coatings have been deposited with ion-assisted deposition.

FIG. 6B shows 25° C. storage and temperature cycling data for modules in which the AR coating 105 was deposited with ion-assist. These models overall exhibited better frequency stability due to the lower moisture permeability of their coatings. Nonetheless, the getter modules exhibited better frequency stability than the modules with no getter.

While this invention has been particularly shown and described with references to preferred embodiments thereof, it will be understood by those skilled in the art that various changes in form and details may be made therein without departing from the scope of the invention encompassed by the appended claims.

What is claimed is:

1. An optical filter system, comprising
   a package;
   an optical filter installed within the package having at least two thin film mirrors that define an optical resonant cavity; and
   a getter in the package that absorbs moisture to stabilize the optical filter.

2. A tunable optical filter system as claimed in claim 1, wherein the package is a hermetic package.

3. A tunable optical filter system as claimed in claim 1, wherein the optical filter is a tunable filter in which at least one of the thin film mirrors is disposed on a release structure.

4. A tunable optical filter system as claimed in claim 3, wherein the release structure is a membrane.

5. A tunable optical filter system as claimed in claim 1, wherein the getter absorbs moisture in the package to stabilize a material stress in the thin film mirrors and thereby stabilize dimensions of the optical resonant cavity.

6. A tunable optical filter system as claimed in claim 1, wherein the thin film mirrors comprise alternating layers including tantalum pentoxide.

7. A tunable optical filter system as claimed in claim 1, wherein the thin film mirrors comprise alternating layers including tantalum pentoxide and silicon dioxide.

8. A process for packaging an optical filter, comprising
   installing an optical filter comprising at least two thin film mirrors, which define an optical resonant cavity, in a package;
   placing a getter in the package to absorb moisture in the package during operation;
   sealing the package with the optical filter and the getter inside.

9. A process as claimed in claim 8, further comprising drying the inside of the package to remove moisture prior to the sealing step.

10. A process as claimed in claim 8, wherein the step of sealing the package comprises sealing a lid onto the package.

11. A process as claimed in claim 8, further comprising applying the getter to the lid prior.

\* \* \* \* \*